United States Patent [19]

Nishi et al.

[11] Patent Number: 4,686,158
[45] Date of Patent: Aug. 11, 1987

[54] SOLID ELECTROLYTE FUEL CELL AND METHOD FOR PREPARING IT

[75] Inventors: Toshiro Nishi; Nobuaki Murakami; Kenji Ueda; Seiichi Shirakawa; Akira Notomi; Kenichi Hisamatsu; Shozo Kaneko, all of Nagasaki, Japan

[73] Assignee: Mitsubishi Jukogyo Kabushiki Kaisha, Tokyo, Japan

[21] Appl. No.: 790,488

[22] Filed: Oct. 23, 1985

[30] Foreign Application Priority Data

Oct. 23, 1984 [JP] Japan ................................ 59-222792
Feb. 28, 1985 [JP] Japan ................................ 60-39329
Feb. 28, 1985 [JP] Japan ................................ 60-39327
Feb. 28, 1985 [JP] Japan ................................ 60-39330
Mar. 5, 1985 [JP] Japan ................................ 60-43444
Aug. 15, 1985 [JP] Japan ................................ 60-179691

[51] Int. Cl.$^4$ ........................ H01M 8/12; H01M 8/24
[52] U.S. Cl. ........................ 429/26; 429/31; 429/33; 29/623.5
[58] Field of Search ........................ 429/26, 30, 31, 32, 429/33, 193; 29/623.5

[56] References Cited

U.S. PATENT DOCUMENTS 3,219,730 11/1965 Bliton et al. ........................ 429/30
4,200,682 4/1980 Sederquist ........................ 429/17
4,329,208 5/1982 Vayenas et al. ........................ 429/33
4,374,184 2/1983 Somers et al. ........................ 429/31

Primary Examiner—Donald L. Walton
Attorney, Agent, or Firm—Holman & Stern

[57] ABSTRACT

A solid electrolyte fuel cell with various improved features has been described. The cell comprises many unit cells each having a structure in which there are laminated a gas-permeable oxygen electrode made from an electron-conducting material, a solid electrolyte consisting of a $(CeO_2)_{1-x}(CaO)_x$ ($x=0.05$ to 0.8) binary system or a third component-containing $(CeO_2)_{1-x}(CaO)_x$ ($x=0.05$ to 0.8) system and a gas-permeable fuel electrode made from an electron-conducting material on a gas-permeable support, many unit cells being connected to each other in series with interconnectors by subjecting end portions of the electrolytes to a masking treatment or the like.

10 Claims, 22 Drawing Figures

SOLID ELECTROLYTE FUEL CELL AND METHOD FOR PREPARING IT

The present invention relates to a fuel cell incorporated with a solid electrolyte and a method for preparing it.

Fuel cells which have been invented by Lord Grove in the first half of the nineteenth century are now at a practicable level after many changes and improvements.

The fuel cell is a kind of device for directly converting chemical energy into electrical energy, and its main constitutinal elements are an anode, a cathode and an electrolyte. As the electrolyte of them, an aqueous solution or a molten salt is usually used, but solid electrolyte fuel cells (i.e., solid oxide fuel cells; hereinafter referred to as SOFC) in which solid materials having an ionic electrical conductivity are employed have also made rapid progress in recent years. SOFC is also called the fuel cell of the third generation and has the following advantages, in contrast to a phosphoric acid type cell (the first generation) and a molten salt type cell (the second generation):

(1) A catalyst of a noble metal such as platinum is not required.

(2) An energy conversion efficiency is higher.

(3) A low-quality fuel such as a coal gas is also usable.

However, when the usual electrolyte such as a $ZrO_2$—$CaO$ system material is used in SOFC, a necessary operation temperature is as high as 1,000° C. and the selection of materials thus is difficult and troublesome.

The solid electrolyte fuel cell can convert chemical energy straightly into direct current energy. However, as described above, its required operation temperature is as high as about 700° C. or more, generally about 1,000° C. in order for the solid electrolyte to have a high conductivity. For this reason, the restriction on the materials is noticeably severe.

In the past days, a lot of electrolytes has been developed, but the conductivity of a stabilized zirconia, $(ZrO_2)_{0.85}(CaO)_{0.15}$, which is generally used in the fuel cell is $2.5 \times 10^{-2}$ (Scm$^{-1}$) at 1,000° C. This value is not considered to be sufficiently high, and thus it is necessary that a wall thickness of the electrolyte is reduced, when used in the fuel cell. Further, the cerium system electrolytes having a good conductivity have been developed of late, but even in these cases, it is naturally needful to decrease their wall thickness.

As be definte from the above, since the conventional electrolyte in the fuel cell has no sufficient conductivity and since the operation temperature is high, the limitation on the materials is stern. Accordingly, the conventional solid electrolyte fuel cell is poor in performance and thus has the drawback that its operation is not easy.

Moreover, in the usual solid electrolyte fuel cell, the electrolyte on the side of a cathode thereof is in contact with moisture in an oxygen gas (or moisture in air, in the case that air is instead employed), and the electrolyte on the side of an anode thereof is in contact with produced water. As a result, when a $CeO_2$—$CaO$ system or a $ZrO_2$—$CaO$ system electrolyte is used, the following reaction will occur and CaO will be consumed, with the result that the fuel cell will deteriorate in performance disadvantageously:

Furthermore, in preparing the fuel cell, the electrolyte is required to be formed into a thin membrane, but in techniques for obtaining the thin electrolyte membranes such as a chemical vapor deposition (CVD) and an electrochemical vapor deposition (EVD), there are problems that facilities are too large and a treating ability per unit time is too low. That is why its industrialization is difficult inconveniently. Additionally, in the case of a usual powdery material for flame spraying, its cost is disadvantageously high, if in the form of a solid solution.

On the other hand, another type of electrolyte, for example, a ceria system ($CeO_2$—$CaO$, $CeO_2$—$Gd_2O_3$ or the like) electrolyte has a much higher conductivity as compared with the zirconia system electrolyte, and permits manufacturing the solid electrolyte fuel cell which can be operated at a relatively low temperature of 700° to 800° C. In such an ceria system electrolyte, however, a transport number of oxygen ions will drop in a zone in which a partial pressure of oxygen is low. In the case of the usual solid electrolyte fuel cell, the oxygen partial pressure on the side of a fuel electrode is very low (about $10^{-15}$ to about $10^{-30}$ atm), and thus the transport number of the oxygen ions in the solid electrolyte will fall, so that its output will deteriorate disadvantageously.

Objects of the present invention are to provide a fuel cell without any problems mentioned above and a method for preparing such a fuel cell.

That is to say, the first object of the present invention is to provide a solid electrolyte fuel cell which comprises many unit cells each having a structure in which there are laminated a gas-permeable oxygen electrode made from an electron-conducting material, a solid electrolyte consisting of a $(CeO_2)_{1-x}(CaO)_x$ (x=0.05 to 0.8) binary system or a third component-containing $(CeO_2)_{1-x}(CaO)_x$ (x=0.05 to 0.8) system and a gas-permeable fuel electrode made from an electron-conducting material on a gas-permeable support, many unit cells being connected to each other in series with interconnectors by subjecting end portions of the electrolytes to a masking treatment or the like.

The second object of the present invention is to provide a solid electrolyte fuel cell which comprises many unit cells each having a structure in which there are laminated a gas-permeable oxygen electrode made from an electron-conducting material, a solid electrolyte consisting of a $(CeO_2)_{1-x}(CaO)_x$ (x=0.05 to 0.8) binary system or a third component-containing $(CeO_2)_{1-x}(CaO)_x$ (x=0.05 to 0.8) system and a gas-permeable fuel electrode made from an electron-conducting material on a gas-permeable support, many unit cells being connected to each other in series with interconnectors by subjecting end portions of the electrolytes to a masking treatment or the like, the fuel cell being further provided with combustion openings for preheating oxygen or air.

The third object of the present invention is to provide a solid electrolyte fuel cell which comprises many unit cells each having a structure in which there are laminated a gas-permeable oxygen electrode made from an electron-conducting material, a solid electrolyte consisting of a $(CeO_2)_{1-x}(CaO)_x$ (x=0.05 to 0.8) binary system or a third component-containing $(CeO_2)_{1-x}(CaO)_x$ (x=0.05 to 0.8) system and a gas-permeable fuel electrode made from an electron-conducting material on a gas-permeable support, many unit cells being connected to each other in series with interconnectors by subjecting end portions of the electrolytes to a masking treatment or the like, the fuel cell being further provided with combustion openings for preheating oxygen or air, an oxygen or air introducing portion of the combustion opening being covered with a filler such as alumina or a filler having a catalytic action in order to prevent hot spots and to facilitate preheating, starting and stopping of the fuel cell.

The fourth object of the present invention is to provide a solid electrolyte fuel cell which comprises many unit cells each in which a solid electrolyte consisting of cerium oxide or zirconium oxide dissolvingly containing a divalent oxide or a trivalent oxide of an alkaline earth metal other than calcium or a rare earth element is laminated on opposite sides or an anode side of a solid electrolyte consisting of cerium oxide or zirconium oxide dissolvingly containing calcium oxide.

The fifth object of the present invention is to provide a solid electrolyte fuel cell in which an electrolyte consisting of a solid solution of cerium oxide and a divalent or a trivalent metallic oxide of an alkaline earth metal or the like is used and a composition of the electrolyte is varied in the direction of its membrane thickness to heighten hydration resistance.

The sixth object of the present invention is to provide a method for preparing a solid electrolyte fuel cell which comprises flame-spraying a solid solution or a ground mixture of cerium oxide and a divalent or a trivalent metallic oxide of an alkaline earth metal or the like as a material, with a feed ratio of the components adjusted to vary a composition of the electrolyte in the direction of its membrane thickness.

The seventh object of the present invention is to provide a method for preparing a solid electrolyte fuel cell which comprises subjecting cerium chloride and a divalent or a trivalent metallic chloride of an alkaline earth metal or the like to a chemical vapor deposition treatment or an electrochemical vapor deposition treatment, with a flow rate or a heating temperature of a gaseous material adjusted to vary a composition of the electrolyte in the direction of its membrane thickness.

The eighth object of the present invention is to provide a method for preparing a solid electrolyte fuel cell which comprises mutually dissolving solid electrolyte materials of cerium oxide or zirconium oxide and a divalent or a trivalent metallic oxide of an alkaline earth metal, a rare earth element or the like; grinding the resultant solid solution; adjusting a grain diameter of a powder obtained by the grinding; and adhesively forming, from the powder, an electrolyte thin membrane on a support of the fuel cell by means of a plasma flame spraying.

The ninth object of the present invention is to provide a method for preparing a solid electrolyte fuel cell which comprises mixing solid electrolyte materials of cerium oxide or zirconium oxide and a divalent or a trivalent metallic oxide of an alkaline earth metal, a rare earth element or the like; grinding the resultant mixture; adjusting a grain diameter of a powder obtained by the grinding; and adhesively forming, from the powder, an electrolyte thin membrane on a support of the fuel cell by means of a flame spraying method.

The tenth object of the present invention is to provide a solid electrolyte fuel cell which comprises many unit cells each in which a stabilized zirconia system solid electrolyte or a ceria system solid electrolyte containing an additive in such an amount or more as to exhibit a maximum value of conductivity is laminated on an anode side of a fundamental electrolyte, and a ceria system solid electrolyte is laminated on a cathode side thereof to form the solid electrolyte having two or more layers.

These objects, features and benefits of the present invention will be apparent from the following detailed description in reference to drawings in which:

FIGS. 1 to 3 show an embodiment of the first aspect of the present invention.

FIGS. 4 to 6 show an embodiment of the second aspect of the present invention.

FIG. 12 and 13 show embodiments of the fourth aspect of the present invention.

FIGS. 14 to 18 show embodiments of the fifth aspect to the seventh aspect of the present invention.

FIGS. 20 to 22 show the tenth aspect of the present invention.

First of all, the first aspect to the third aspect of the present invention are characterized by using a $CeO_2$—$CaO$ binary system or a third component-containing $CeO_2$—$CaO$ system solid electrolyte.

Here, reference will be made to the $CeO_2$—$CaO$ binary system and the third component-containing $CeO_2$—$CaO$ system solid electrolyte.

It is known that an optimum amount of a second component which is a calcium ion and which has influence on a conductivity of the solid electrolyte is within the range of 10 to 20 mol%. With regard to the binary systems and the third component-containing systems in which the third components are contained, investigation has been made.

The CeO$_2$—CaO binary system and the third component-containing CeO$_2$—CaO system solid electrolyte have a great conductivity. In other words, they have 10 to 100 times as much a conductivity as a stabilized zirconia such as ZrO$_2$—CaO system at a certain temperature.

They are a composition of $(CeO_2)_{1-x}(CaO)_x$ (x=0.05 to 0.8) and a combined composition of the aforesaid composition and the third component of a divalent or a trivalent metallic oxide such as MgO, Al$_2$O$_3$ or a rare earth oxide.

Such a solid electrolyte used in the present invention can easily be prepared usually by sintering. That is to say, components of CaO, CeO$_2$, MgO, Al$_2$O$_3$ and the like can be each prepared from an oxide starting material by calcining at about 1,300° C., molding, and sintering the oxide at about 1,450° C.

In addition to these oxides, other starting materials such as carbonates and oxalates may be used, and these compounds are heated to corresponding oxides.

Table 1 below sets forth compositions of CeO$_2$—CaO binary system electrolytes, and Table 2 sets forth compositions of third component-containing CeO$_2$—CaO system electrolyted to which the third components are added.

TABLE 1

| Example | Composition |
|---|---|
| A | $(CeO_2)_{0.85}(CaO)_{0.15}$ |
| B | $(CeO_2)_{0.8}(CaO)_{0.2}$ |
| C | $(CeO_2)_{0.2}(CaO)_{0.8}$ |
| D | $(CeO_2)_{0.85}(CaO)_{0.15}$ |

Example D: $(CeO_2)0.2(CaO)_{0.8}$

TABLE 2

| Example | Composition |
|---|---|
| E | $(CeO_2)_{0.7}(CaO)_{0.2}(AlO_{1.5})_{0.1}$ |
| F | $(CeO_2)_{0.45}(CaO)_{0.5}(MgO)_{0.05}$ |
| G | $(ZrO_2)_{0.89}(CaO)_{0.11}$ |

Figure 8:
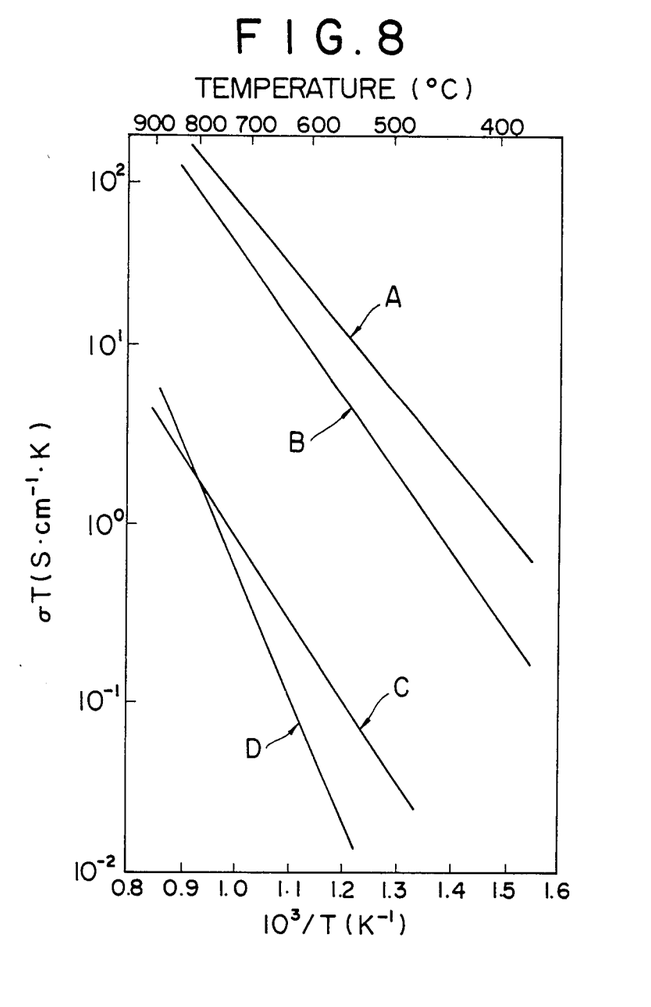
FIGS. 8 and 10 are graphs showing temperature—conductivity characteristics of various solid electrolytes used in the embodiments regarding the present invention.
Figure 9:
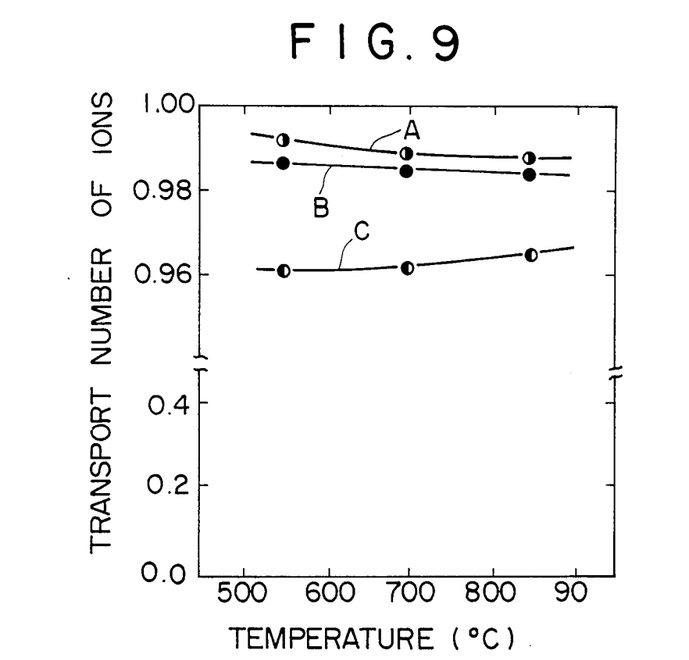
FIGS. 9 are 11 are graphs showing temperature—ion transport number characteristics of the above-mentioned electrolytes.
Figure 10:
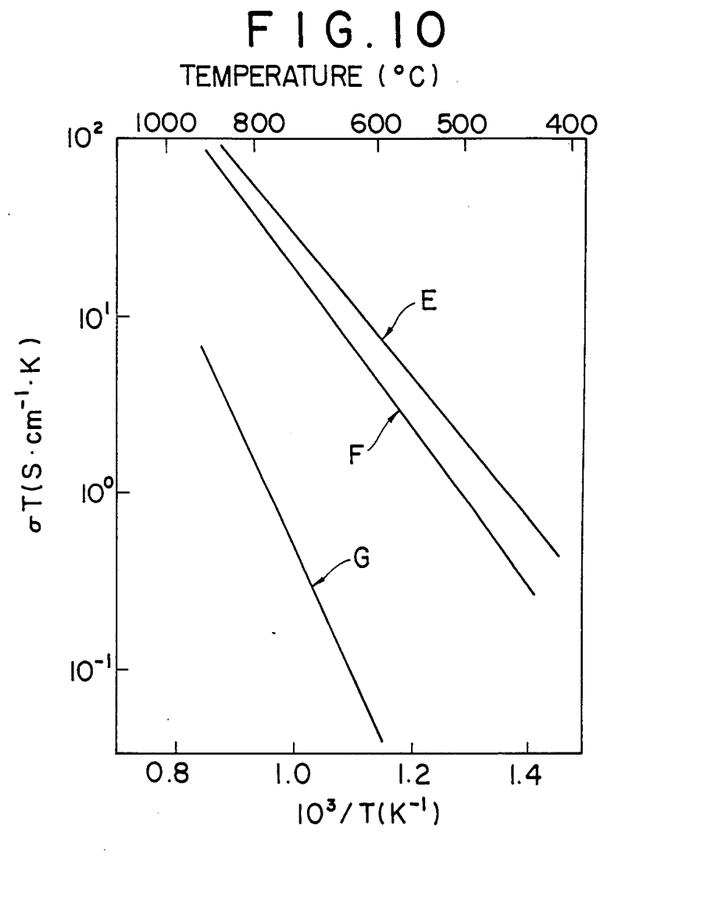

Temperature changes of conductivities ($\sigma$) and ion transport numbers of the electrolytes in Table 1 are shown in FIGS. 8 and 9. In like manner, temperature changes of conductivities and ion transport numbers of the electrolytes in Table 2 are shown in FIGS. 10 and 11.

Figure 11:
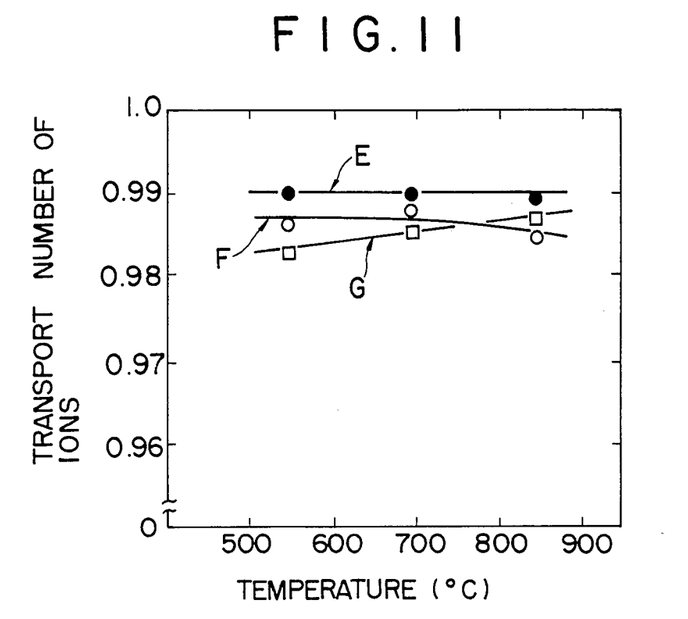

In FIGS. 9 and 11, the solid electrolytes of the CeO$_2$—CaO binary systems and the third component-containing CeO$_2$—CaO systems have ion transport numbers of 96% or more.

The first aspect of the present invention has been completed on the basis of the above-mentioned knowledge.

That is to say, the first aspect of the present invention is directed to a solid electrolyte fuel cell which comprises many unit cells each having a structure in which there are laminated a gas-permeable oxygen electrode made from an electron-conducting material, a solid electrolyte consisting of a $(CeO_2)_{1-x}(CaO)_x$ (x=0.05 to 0.8) binary system or a third component-containing $(CeO_2)_{1-x}(CaO)_x$ (x=0.05 to 0.8) system and a gas-permeable fuel electrode made from an electron-conducting material on a gas-permeable support, many unit cells being connected to each other in series with interconnectors by subjecting end portions of the electrodes to a masking treatment or the like.

According to the thus constituted present invention, a fuel such as methane performs a modification reaction on the outer surface of the structure (hereinafter referred to as the improved cell) in which there are laminated the gaspermeable oxygen electrode made from the electron-conducting material, the solid electrolyte consisting of the $(CeO_2)_{1-x}(CaO)_x$ (x=0.05 to 0.8) binary system or the third component-containing $(CeO_2)_{1-x}(CaO)_x$ (x=0.05 to 0.8) system and the gas-permeable fuel electrode made from an electron-conducting material on the support. As a result, hydrogen and carbon monoxide will be produced thereon, and the thus produced hydrogen and carbon monoxide or initially introduced hydrogen or carbon monoxide will react with oxygen ions on the outer surface of the improved cell in order to produce water and carbon dioxide and to thereby accomplish the power generation of direct current. Further, the respective improved cells are connected in series to each other with interconnectors by subjecting end portions of the electrodes to a masking treatment or the like, whereby a large amount of electric power can be generated.

An embodiment of the first aspect according to the present invention will be described in reference to FIGS. 1 to 3.

Figure 1:
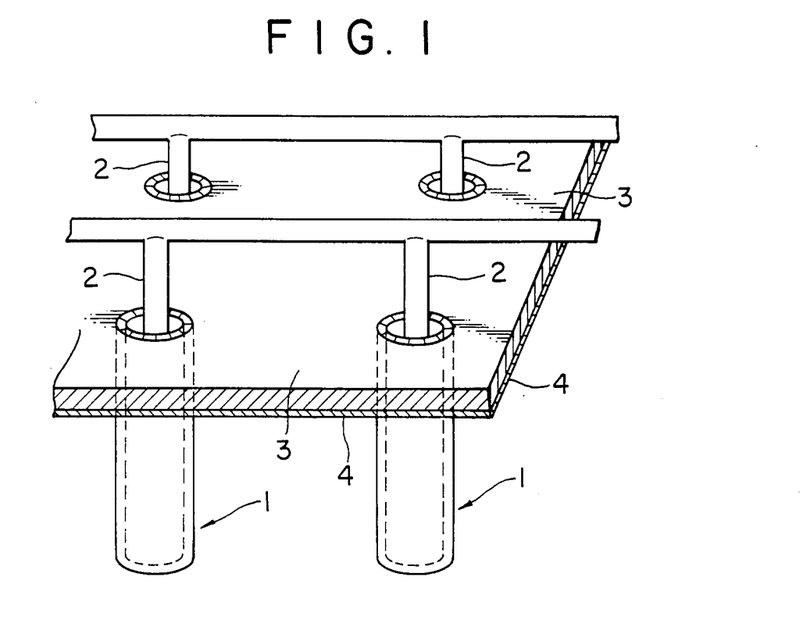
FIG. 1 is its perspective view.
Figure 2:
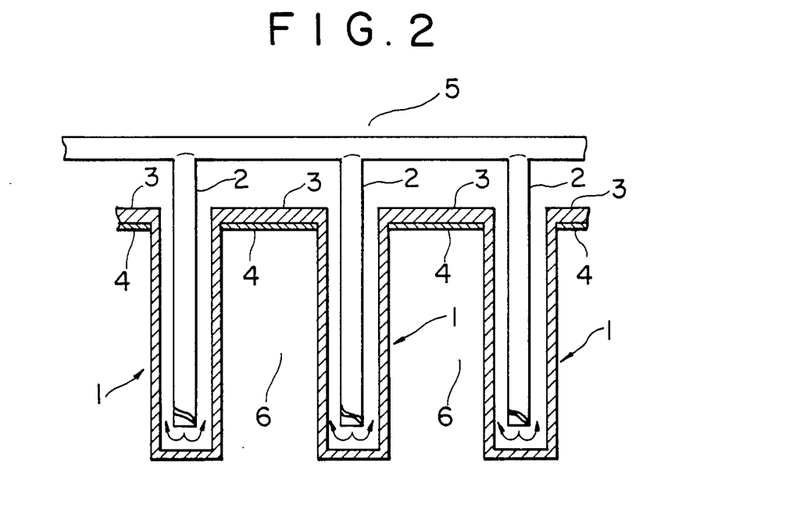
FIG. 2 is its sectional view.
Figure 3:
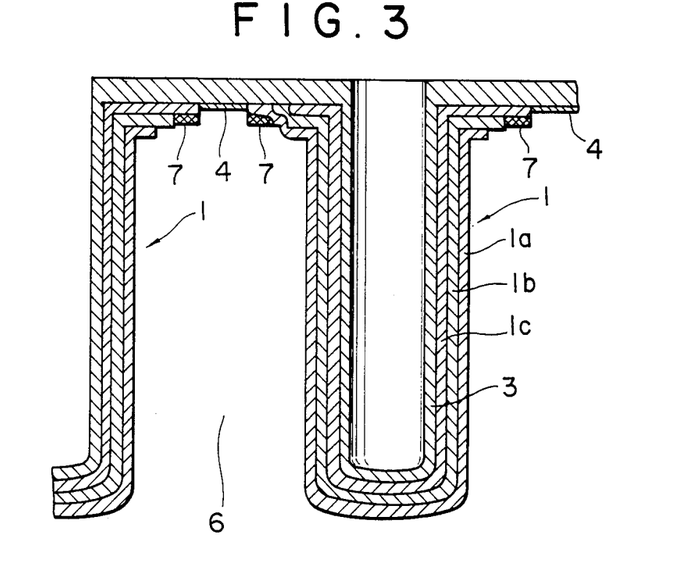
FIG. 3 is its partially enlarged view.

FIGS. 1 to 3 show one embodiment of the present invention, i.e., a solid electrolyte fuel cell in which a CeO$_2$—CaO binary system or a third component-containing CeO$_2$—CaO system solid electrolyte is employed.

In FIG. 1, an appearance of the improved cell is exhibited, and reference numeral 1 is a cylindrical cell an end portion of which is closed. Numeral 2 is an introduction pipe for oxygen or air, and this pipe is made from a heat-resistant and acid-resistant material such as alumina. Numeral 3 is a support associated with the cell 1 and the back surface of the support is covered with a thin membrane 4 of an electrolyte. FIG. 2 shows a sectional view of FIG. 1, and the same numerals as in FIG. 1 represent the corresponding members. In FIG. 2, numeral 5 is an oxygen feed chamber, and numeral 6 is a fuel feed chamber for feeding a fuel such as hydrogen, carbon monoxide, methane or the like.

In such a constitution, oxygen discharged from the oxygen introduction pipe 2 changes into oxygen ions, and thus a partial pressure of oxygen gets smaller toward upward. A fuel such as methane from the fuel feed chamber 6 performs a modification reaction on the outer surface of the cell 1 in order to produce hydrogen and carbon monoxide, and the thus produced hydrogen and carbon monoxide, or initially introduced hydrogen or carbon monoxide reacts with oxygen ions on the outer surface of the cell 1 to produce water and carbon dioxide, thereby generating direct current power.

FIG. 3 is a sectional view illustrating the cell 1 in detail. Numeral 1a is a gas-permeable fuel electrode made from an electron-conducting material, and this fuel electrode 1a has a function of reacting or modifying the fuel with oxygen ions. Numeral 1b is a solid electrolyte having an oxygen ion conductivity and is made from a CeO$_2$—CaO system or a usual ZrO$_2$—CaO system. Reference numeral 1c is a gas-permeable oxygen electrode made from an electron-conducting material and serves to convert oxygen into oxygen ions.

The fuel electrode 1a, the solid electrolyte 1b and the oxygen electrode 1c are laminated on the support 3 in a well known manner. This support 3 is composed of a gas-permeable porous alumina, a stabilized zirconia, the above-mentioned solid electrolyte and the like. Numeral 7 is an interconnector having electron-conductivity and serving to connect the cells 1 with each other in series. This interconnector is disposed in a reducing atmosphere in the fuel feed chamber 6, and thus there is no problem of its deterioration due to oxidation. The fuel electrode 1a, the solid electrolyte 1b and the oxygen electrode 1c in the vicinity of each interconnector 7 are laminated so as to be connected in series by means of a well known masking technique.

As be definite from the foregoing, in the present invention, the solid electrolyte comprising the $(CeO_2)_{1-x}(CaO)_x$ ($x=0.05$ to $0.8$) system or the third component-containing $(CeO_2)_{1-x}(CaO)_x$ ($x=0.05$ to $0.8$) system is incorporated into the fuel cell in place of a conventional stabilized zriconia, and so the fall of an output resulting from an IR drop and the like can be reduced.

Further, even if the thickened electrolyte membrane is employed in the cell with the intensions of lowering an operation temperature and reducing an occurrence rate of pinholes, the output of the cell can be maintained at the same level as in the case of the stabilized zirconia.

In consequence, the electric power generation performance of the solid eletcrolyte fuel cell can be more heightened as compared with the conventional one.

Since the cell is constructed as shown in FIGS. 1 to 3, a higher performance and a safer operation inclusive of starting and stopping can be established.

Next, reference will be made to the second aspect of the present invention which is an improved type of the first aspect just described.

That is to say, the second aspect of the present invention is directed to a solid electrolyte fuel cell which comprises many unit cells each having a structure in which there are laminated a gas-permeable oxygen electrode made from an electron-conducting material, a solid electrolyte consisting of a $(CeO_2)_{1-x}(CaO)_x$ ($x=0.05$ to $0.8$) binary system or a third component-containing $(CeO_2)_{1-x}(CaO)_x$ ($x=0.05$ to $0.8$) system and a gas-permeable fuel electrode made from an electron-conducting material on a gas-permeable support, many unit cells being connected to each other in series with interconnectors by subjecting end portions of the electrolytes to a masking treatment or the like, the fuel cell being further provided with combustion openings for preheating oxygen or air.

Now, the second aspect of the present invention will be described in reference to FIGS. 4 to 6.

Figure 4:
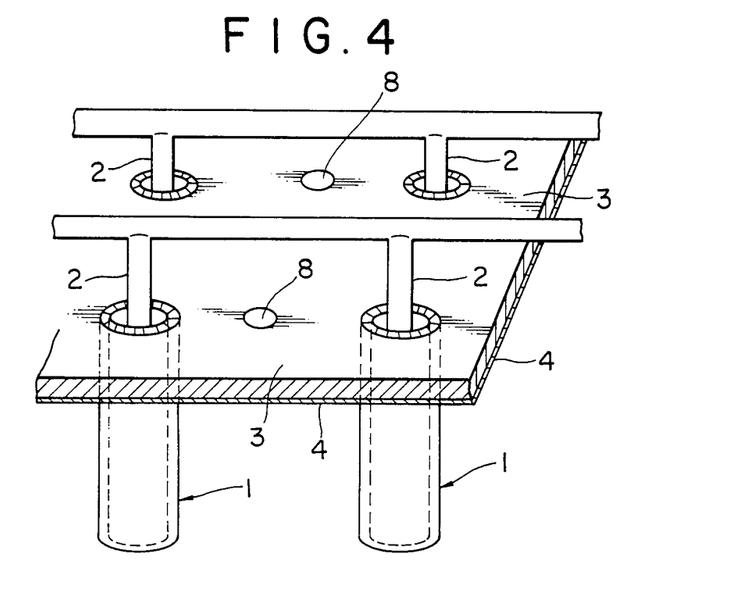
FIG. 4 is its perspective view.
Figure 5:
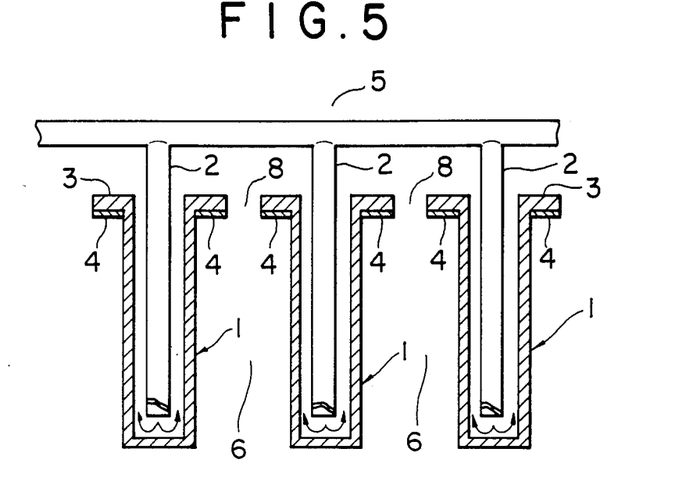
FIG. 5 is its sectional view.
Figure 6:
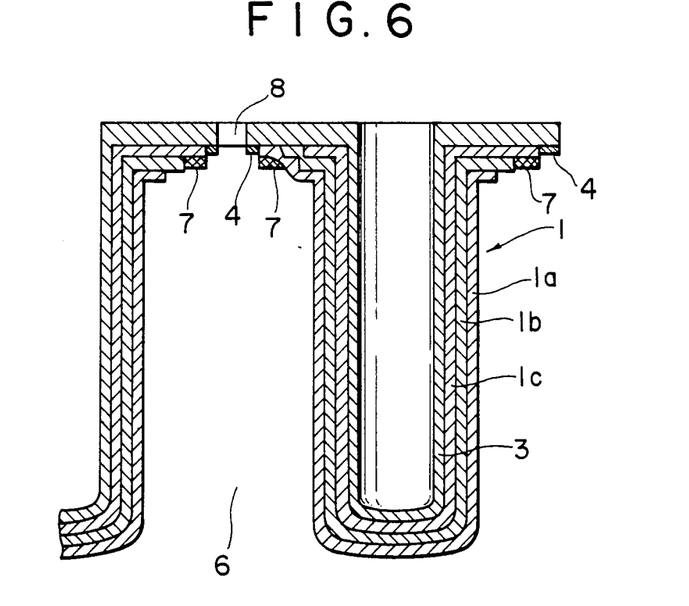
FIG. 6 is its partially enlarged view.

In an embodiment shown in FIGS. 4 to 6, numerals 1 to 7 represent the corresponding members in FIGS. 1 to 3, and thus the description of them will be omitted. Another numeral 8 is a combustion opening disposed between the cells 1, 1. In this case, the interconnector 7 is not placed necessarily at the combustion opening 8 where a temperature will be elevated, and it should be arranged between the adjacent cells 1, 1 and at such a position as to permit connecting the oxygen electrode 1c to the fuel electrode 1a.

This combustion opening 8 serves to preheat oxygen or air by the combustion of the unutilized fuel. The unutilized fuel such as oxygen, carbon monoxide, methane or the like in the fuel feed chamber 6 flows through the combustion opening 8 to the oxygen feed chamber 5, where the fuel reacts with oxygen. At this time, the oxygen introduction pipe 2 is heated by the generated combustion heat in order to preheat oxygen or air in the pipe 2, whereby an outer heating operation for oxygen or air can be omitted.

As be apparent from the description given above, the second aspect of the present invention can obtain the following functional effects in addition to the aforesaid effects of the first aspect:

That is to say, since the combustion opening is disposed between the respective cells, the fuel coming through the combustion opening reacts with oxygen to generate the combustion heat, by which the oxygen introduction pipe is heated. As a result, oxygen or air in the pipe can be preheated and it can be therefore omitted to heat oxygen or air from outside.

The third aspect of the present invention is a further improved type of the second aspect just described.

That is to say, the third aspect of the present case is directed to a solid electrolyte fuel cell which comprises many unit cells each having a structure in which there are laminated a gas-permeable oxygen electrode made from an electron-conducting material, a solid electrolyte consisting of a $(CeO_2)_{1-x}(CaO)_x$ ($x=0.05$ to $0.8$) binary system or a third component-containing $(CeO_2)_{1-x}(CaO)_x$ ($x=0.05$ to $0.8$) system and a gas-permeable fuel electrode made from an electron-conducting material on a gas-permeable support, many unit cells being connected to each other in series with interconnectors by subjecting end portions of the electrolytes to a masking treatment or the like, the fuel cell being further provided with combustion openings for preheating oxygen or air, an oxygen or air introducing portion of the combustion opening being covered with a filler such as alumina or a filler having a catalytic action in order to prevent hot spots and facilitate preheating, starting and stopping of the fuel cell.

Now, the third aspect of the present invention will be described in reference to FIG. 7.

Figure 7:
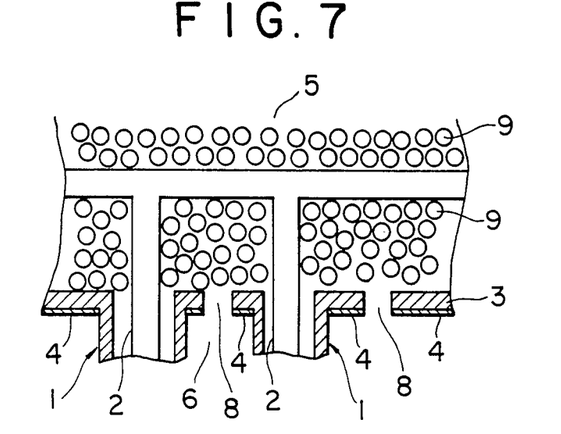
FIG. 7 is a sectional view illustrating an embodiment of the third aspect of the present invention.

In an embodiment shown in FIG. 7, numerals 1 to 8 represent the corresponding members in FIGS. 1 to 6, and thus the description of them will be omitted. Numeral 9 is a filler such as alumina with or without a catalytic action.

This combustion opening 8 serves to preheat oxygen or air by the combustion of the unutilized fuel. The unutilized fuel such as hydrogen, carbon monoxide, methane or the like in the fuel feed chamber 6 moves through the combustion opening 8 to the oxygen feed chamber 5, where the fuel reacts with oxygen. At this time, the oxygen introduction pipe 2 is heated by the generated combustion heat in order to preheat oxygen or air in the pipe 2, whereby an outer heating operation for oxygen or air can be omitted.

Further, with the aid of the filler 9 such as alumina, oxygen or air can be effectively preheated by the combustion heat of the unused fuel.

Furthermore, the employment of alumina having the catalytic action as the filler 9 permits providing advantages such as perfect combustion and decrease in environmentally harmful components such as Nox, Sox and the like.

In addition, according to the third aspect of the present invention, the phenomenon of hot spot can be prevented, and heat storage can be carried out, whereby the starting and stopping operations can also be facilitated.

As be apparent from the above-mentioned embodiment, the third aspect of the present invention has the following functional effects besides the aforesaid effects of the first and the second aspect:

That is to say, on the basis of the synergistic effect obtained from the combination of the functional effects of the first, second and third aspects of the present invention, the excellent solid electrolyte fuel cell can be prepared.

It is fair to say that the present invention improves the performance of the solid electrolyte fuel cell, facilitates drive and operation, and is thus industrially very useful.

Next, reference will be made to the fourth aspect of the present invention.

The fourth aspect of the present invention is directed to a solid electrolyte fuel cell which comprises many unit cells each in which a solid electrolyte consisting of cerium oxide or zirconium oxide dissolvingly containing a divalent oxide or a trivalent oxide of an alkaline earth metal other than calcium or a rare earth element is laminated on opposite sides or an anode side of a solid electrolyte consisting of cerium oxide or zirconium oxide dissolvingly containing calcium oxide.

According to such a solid electrolyte fuel cell, since the surface of the electrolyte which will be brought into contact with a gas containing water is composed of the electrolyte (e.g., a $CeO_2$—MgO system) containing no calcium oxide, and since the gas does not penetrate through this fine electrolyte, it is possible to provide the inside electrolyte containing calcium oxide with a hydration resistance. In this connection, the reason why the electrolyte containing no calcium oxide may be caused to adhere only to the anode side is that a water content on the side of the cathode is lower than on the side of the anode. Even if coating is carrried out on the surface of the electrolyte as mentioned above, material costs can remain at a low level, because most part of the electrolyte consists of the $CeO_2$—CaO system or the $ZrO_2$—CaO system.

Now, the fourth aspect of the present invention will be described in reference to FIG. 12. For an easier clarification, two terms will be defined as follows:

Inside electrolyte: A $CeO_2$—CaO system or a $ZrO_2$—CaO system electrolyte.

Surface electrolyte: A $CeO_2$ system or a $ZrO_2$ system electrolyte in which there is dissolved a divalent or a trivalent oxide of an alkaline earth metal except calcium, a rare earth element or the like.

Figure 12:
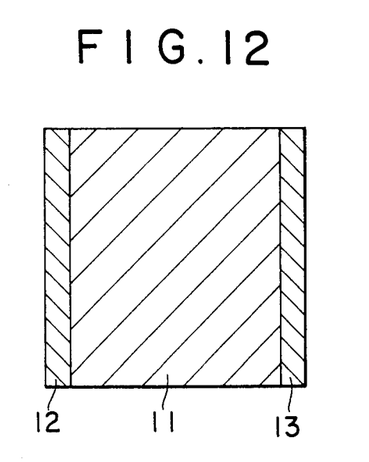
FIG. 12 is a sectional view of the solid electrolyte used in the solid electrolyte fuel cell in one embodiment.

In a solid electrolyte used in a fuel cell regarding the present invention, surface electrolytes 12, 13 are laminated on both the sides of an anode and a cathode of an inside electrolyte 11, as shown in FIG. 12.

In the fuel cell in which such a solid electrolyte is used, the surface electrolytes 12, 13 contain no calcium oxide, and thus any reaction with water will not occur. Additionally, since these surface electrolytes 12, 13 are fine, no water will penetrate through them and will reach the inside electrolyte 11. In consequence, calcium oxide which is dissolved in the inside electrolyte 11 will not be lost. In particular, when the $CeO_2$—CaO system is used for the inside electrolyte 11, its excellent performance can be maintained advantageously.

Figure 13:
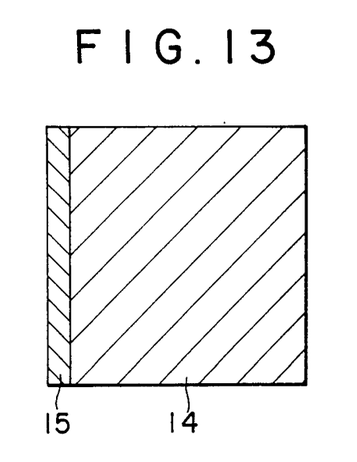
FIG. 13 is a sectional view of the solid electrolyte used in the solid electrolyte fuel cell in the other embodiment.

In this connection, the solid electrolyte used in the fuel cell regarding the present invention is not limited to the structure shown in FIG. 12 and may take another structure as in FIG. 13 in which the surface electrolyte 15 is laminated only on the anode side of the inside electrolyte 14.

In general, a water amount on the cathode side is smaller than on the anode side, and thus even when such a constitution as in FIG. 13 is taken, the substantially same functional effect as in the case of the solid electrolyte shown in FIG. 12 can be obtained.

According to the present invention described above in detail, there can be provided the solid electrolyte fuel cell by which any performance deterioration due to the reaction with water does not occur.

Next, the fifth aspect to the seventh aspect of the present invention will be described.

First, the fifth aspect of the present invention is directed to a solid electrolyte fuel cell in which an electrolyte consisting of a solid solution of cerium oxide and a divalent or a trivalent metallic oxide of an alkaline earth metal or the like is used and a composition of the electrolyte is varied in the direction of its membrane thickness to heighten hydration resistance.

That is to say, in the case of a $CeO_2$—CaO system electrolyte, a maximum value of its conductivity is present within the extensive range of ten odd mol% to about 50 mol% of a CaO molar fraction. Therefore, even if in the surface of the electrolyte which will be brought into contact with a gas containing water, an amount of CaO is small, any performance will not deteriorate and a hydration resistance can be provided, so that the drop in the performace can be prevented. Further, since the opposite surfaces or an anode surface alone of the electrolyte is low in a CaO content ratio and the inside portion thereof is high in this ratio, material costs can be maintained at a low level.

The sixth aspect of the present invention is a method for preparing the solid electrolyte fuel cell of the fifth aspect just described and is charactrized by flame-sparying materials which are cerium oxide and calcium oxide or the like which will become another component, with a feed ratio of the components adjusted to vary a composition of the electrolyte in the direction of its membrane thickness.

The seventh aspect of the present invention also is a method for preparing the solid electrolyte fuel cell of the fifth aspect and is characterized by subjecting cerium chloride and calcium chloride or the like, which are geseous materials, to a chemical vapor deposition (CVD) treatment or an electrochemical vapor deposition (EVD) treatment, with a flow rate or a heating temperature of the gaseous materials adjusted to vary a composition of the electrolyte in the direction of its membrane thickness.

Now, embodiments of the fifth aspect to the seventh aspect of the present invention will be described in reference to drawings.

Figure 14:
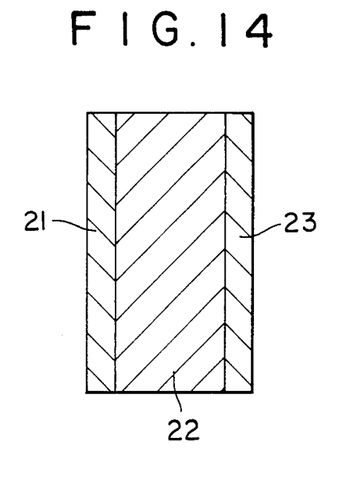
FIG. 14 is a sectional view of the solid electrolyte thin plate used in the solid electrolyte fuel cell in the embodiment of the fifth aspect.

FIG. 14 shows a solid electrolyte membrane used in a fuel cell regarding the present invention, and this electrolyte membrane is composed of a low-CaO membrane 21 on the side of its anode, a low-CaO membrane 23 on the side of its cathode and a high-CaO membrane 22 therebetween.

In the case of a $CeO_2$—CaO system, its conductivity is high and a maximum value of the conductivity is present in an extensive range of ten odd mol% to 50 mol% of CaO molar fraction. For the sake of the effective utilization of these facts, the low-CaO membranes 21, 23 to be used should contain about ten odd mol% to about 40 mol% of CaO and the high-CaO membrane 22 to be used should contain about 40 to about 50 mol% of CaO. In the high-CaO membrane 22, a concentration of CaO may be constant or inclined.

According to such a solid electrolyte thin membrane, the fuel cell can be provided with hydration resistance, while maintaining a maximum value of the conductivity on the whole, as mentioned above. That is to say, since the portions which will be brought into contact with a gas containing moisture are the low-CaO membranes 21, 23, the component CaO will scarcely react with water, and since the low-CaO membranes 21, 23 are finely constituted, little water will penetrate through the low-CaO membranes 21, 23 and will reach the high-CaO membrane 22. Therefore, the performance deterioration of the fuel cell due to the consumption of CaO can be prevented.

Figure 15:
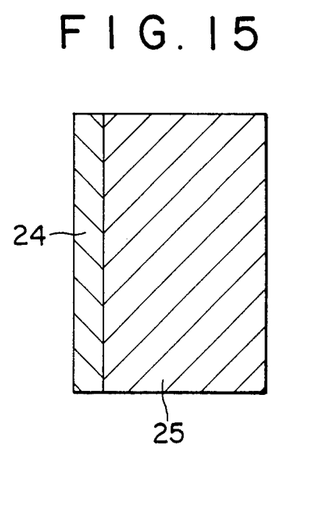
FIG. 15 is a sectional view of the solid electrolyte thin plate used in the solid electrolyte fuel cell in the other embodiment of the same aspect.

The solid electrolyte thin membrane used in the fuel cell regarding the present invention is not limited to the structure shown in FIG. 14, but may be composed of the low-CaO membrane 24 on the anode side of the electrolyte and the high-CaO membrane 25.

In general, a water content on the cathode side of the electrolyte is lower than on the anode side thereof, and thus even such a constitution as shown in FIG. 15 can obtain about the same effect as in the solid electrolyte thin membrane shown in FIG. 14.

Next, reference will be made to a method for forming the solid electrolyte thin membranes shown in FIGS. 14 and 15.

In the first place, the constitution of devices for flame spraying will be described in accordance with FIGS. 16 to 18.

Figure 16:
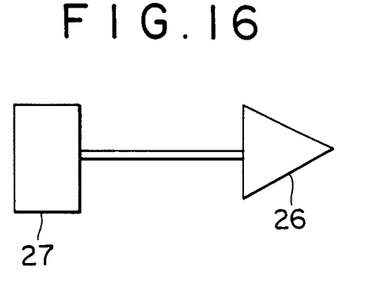
FIG. 16 is a schematic constitutional view of a flame spraying device used in the embodiment of the sixth aspect.

In FIG. 16, a flame spraying nozzle 26 is connected to a material feed box 27 which is packed with a powdery mixture of $CeO_2$(or $ZrO_2$) and CaO or the like. A composition of the powdery mixture in the material feed box 27 is changed so as to vary a composition of the solid electrolyte thin membrane in the direction of a membrane thickness and to thereby prepare the desired low-CaO membrane and high-CaO membrane.

Figure 17:
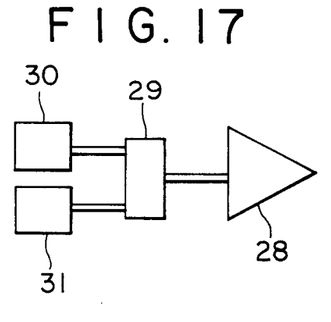
FIG. 17 is a schematic constitutional view of a flame spraying device used in the other embodiment of the sixth aspect.

In FIG. 17, a flame spraying nozzle 28 is connected to a mixing machine 29, which is further connected to a $CeO_2$ (or $ZrO_2$) feed box 30 and a CaO feed box 31. In this case, the composition of the solid electrolyte thin membrane is varied in the direction of the membrane thickness by changing feed rates of the materials from the $CeO_2$(or $ZrO_2$) feed box 30 and the CaO feed box 31.

Figure 18:
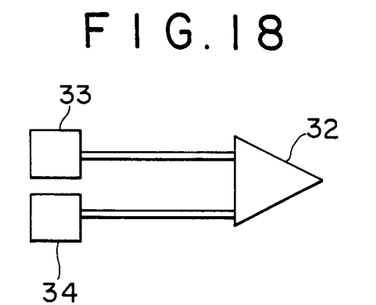
FIG. 18 is a schematic constitutional view of a flame spraying device used in the further other embodiment of the sixth aspect.

In FIG. 18, a $CeO_2$(or $ZrO_2$) feed box 33 and a CaO feed box 34 are connected to a flame spraying nozzle 32. Materials from the respective feed boxes are mixed in a plasma state. Also in this case, the composition of the solid electrolyte thin membrane is varied in the direction of the membrane thickness by changing feed rates of the materials from the $CeO_2$(or $ZrO_2$) feed box 33 and the CaO feed box 34.

According to the above-mentioned procedure, the solid electrolyte fuel cell can be manufactured in which its performance deterioration caused by the reaction with water will not occur.

Further, reference will be made to a method for forming the solid electrolyte thin membranes shown in FIG. 14 and 15 by the use of the chemical vapor deposition process (CVD) or the electrochemical vapor deposition process (EVD).

In carrying out this method, a flow rate or a heating temperature of a material gas of $CeCl_2$ or another component $CaCl_2$ for the chemical vapor deposition or the electrochemical vapor deposition is adjusted, so that a composition of the solid electrolyte thin membrane is varied in the direction of a membrane direction.

Also in such a manner, the solid electrolyte fuel cell can be manufactured in which its performance deterioration resulting from the raction with water will not occur.

The present invention described above in detail permits providing the solid electrolyte fuel cell in which the performance deterioration due to the reaction with water will not occur, and providing the method for easily manufacutring such solid electrolyte fuel cells.

Next, the eighth aspect of the present invention will be described.

The eighth aspect thereof is directed to a method which comprises dissolving powdery starting materials of oxides in each other, grinding the resultant solid solution, adjusting a grain diameter of a powder obtained by the grinding, and adhesively forming, from the powder, an electrolyte thin membrane on a support of the fuel cell by means of a plasma flame spraying.

According to this method, such a large scale apparatus as in the CVD process or the EVD process is not required, and the high-performacne solid electrolyte fuel cells can be manufactured with a high productivity.

Now, an embodiment of the eighth aspect of the present invention will be described.

First, a powder of cerium oxide ($CeO_2$) or zirconium oxide ($ZrO_2$) and a powder of a divalent or a trivalent metallic oxide of an alkaline earth metal or a rare earth element are separately subjected to a heat treatment at 1,250° C. These powders are mixed so as to become compositions shown in Table 3, and are then thermally treated at 1,450° C. to produce solid solutions. Afterward, each solid solution is ground by the use of a mill such as a ball mill, a vibration mill or a disc mill. A grain diameter of the ground powder is then regulated by means of an air flow type classifier in order to prepare a solid electrolyte powder for flame spraying.

Figure 19:
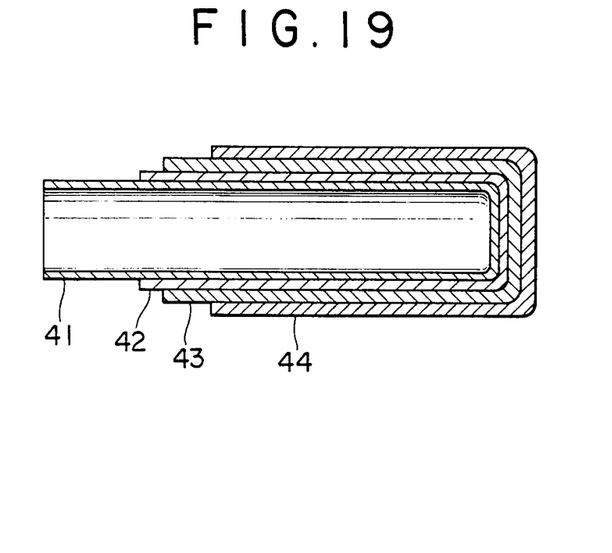
FIG. 19 is a sectional view of a solid electrolyte fuel cell prepared in an embodiment of the eighth aspect of the present invention.

Afterward, as shown in FIG. 19, a fuel electrode 42 is formed on the surface of a support 41, and the electrolyte material powder containing the respective components and having a grain diameter of 5 μm or less is subjected to a plasma flame spraying treatment so as to form an electrolyte thin membrane 43 having a thickness of 200 μm on the fuel electrode 42. At this time, for the sake of uniformizing its thickness at a level of 200 μm, a rotational speed of the support and a feed rate of the material powder are kept constant. Moreover, on the surface of the electrolyte thin membrane 43, an oxygen electrode 44 is formed, thereby manufacturing the fuel cell.

For the thus manufactured fuel cells, terminal voltages are measured by employing a fuel hydrogen (50%) and oxygen (air), and loading at 900° C. for the purpose of testing the performance of the fuel cells. The results are set forth together in Table 3.

TABLE 3

| Example | Composition | Terminal Voltage (mV) |
|---------|-------------|-----------------------|
| 1 | $(CeO_2)_{0.9}(CaO)_{0.1}$ | 480 |
| 2 | $(CeO_2)_{0.8}(CaO)_{0.2}$ | 750 |
| 3 | $(CeO_2)_{0.6}(CaO)_{0.4}$ | 730 |
| 4 | $(CeO_2)_{0.8}(BaO)_{0.2}$ | 520 |
| 5 | $(CeO_2)_{0.8}(MgO)_{0.2}$ | 510 |
| 6 | $(CeO_2)_{0.8}(SrO)_{0.2}$ | 740 |
| 7 | $(CeO_2)_{0.75}(CaO)_{0.2}(Al_2O_3)_{0.05}$ | 710 |
| 8 | $(ZrO_2)_{0.87}(Y_2O_3)_{0.13}$ | 490 |

Next, for the electrolyte $(CeO_2)_{0.8}(CaO)_{0.2}$ which shows the highest terminal voltage in Table 3, relations between the grain diameter of the material powder and the terminal voltage of the fuel cell are inspected. The results are set forth in Table 4.

TABLE 4

| Grain Diameter (μ) | Terminal Voltage (mV) |
| --- | --- |
| 20- | 360 |
| 10-20 | 470 |
| 5-10 | 540 |
| 5 or less | 750 |
| 2 or less | 790 |

As be definite from the results in Table 4, when the method of the present invention is employed, the smaller the grain diameter is, the higher the performance of the manufactured fuel cell is. This reason would be that the fine grains overlap each other in the state of many layers to increase a contact area between the respective grains, which fact inhibits the occurrence of pinholes, with the aid of the thin membrane being fine.

In addition, with regard to the fuel cell to be manufactured by the method of the present invention, the fuel electrode and the oxygen electrode in FIG. 19 may be replaced with each other.

According to the method of the present invention described above in detail, the high-performance solid electrolyte fuel cells can be manufactured with a high productivity but without using any large scale apparatus.

Next, reference will be made to the ninth aspect of the present invention.

The ninth aspect of the present invention is directed to a method which comprises mixing oxide powders which are starting materials, grinding the resultant mixture, adjusting a grain diameter of a powder obtained by the grinding, and adhesively forming, from the powder, an electrolyte thin membrane on a support of the fuel cell by means of a flame spraying method.

According to the above-mentioned method, such a large scale apparatus as in the CVD process or the EVD process is not required, and material costs can also be more reduced than the eighth aspect invention described above in which the material powder of the solid solution is flame-sprayed.

Now, an embodiment of the ninth aspect of the present invention will be described.

In the first place, a powder of cerium oxide ($CeO_2$) or zirconium oxide ($ZrO_2$) and a powder of a divalent or a trivalent metallic oxide of an alkaline earth metal or a rare earth element are separately subjected to a heat treatment at 1,250° C. These powders are mixed so as to become compositions shown in Table 5. Afterward, the powdery mixture is ground by the use of a mill such as a ball mill, a vibration mill or a disc mill. A grain diameter of the ground powder is then regulated by means of an air flow type classifier in order to prepare a solid electrolyte powder for flame spraying.

Afterward, the same procedure as in the embodiment of the eighth invention is repeated to manufacture the fuel cells each having the same constitution as shown in FIG. 19.

In Comparative Example A in Table 5, a solid solution having the same composition as in Example 2A is employed.

For the thus manufactured fuel cells, terminal voltages are measured by employing a fuel hydrogen (50%) and oxygen (air), and loading at 900° C. for the purpose of testing the performance of the fuel cells. The results are set forth together in Table 5.

TABLE 5

| Example | Composition | Terminal Voltage (mV) |
| --- | --- | --- |
| 1A | $(CeO_2)_{0.9}(CaO)_{0.1}$ | 470 |
| 2A | $(CeO_2)_{0.8}(CaO)_{0.2}$ | 740 |
| 3A | $(CeO_2)_{0.6}(CaO)_{0.4}$ | 730 |
| 4A | $(CeO_2)_{0.8}(BaO)_{0.2}$ | 520 |
| 5A | $(CeO_2)_{0.8}(MgO)_{0.2}$ | 500 |
| 6A | $(CeO_2)_{0.8}(SrO)_{0.2}$ | 730 |
| 7A | $(CeO_2)_{0.75}(CaO)_{0.2}(Al_2O_3)_{0.05}$ | 700 |
| 8A | $(ZrO_2)_{0.87}(Y_2O_3)_{0.13}$ | 470 |
| Comp. Ex. A | $(CeO_2)_{0.8}(CaO)_{0.2}$ | 750 |

The results in Table 5 indicate that Comparative Example A in which the powdery material of the solid solution is used is substantially similar in the performance of the fuel cell to Example 2A in which the mixed, ground and grain size-regulated powdery material is employed. Therefore, it is apparent that in the ninth aspect of the present invention, material costs are lower than in the conventional fuel cells.

Next, for the electrolyte $(CeO_2)_{0.8}(CaO)_{0.2}$ which shows the highest terminal voltage in Table 5, relations between the grain diameter of the material powder and the terminal voltage of the fuel cell are inspected. The results are set forth in Table 6.

TABLE 6

| Grain Diameter (μ) | Terminal Voltage (mV) |
| --- | --- |
| 20- | 330 |
| 10-20 | 440 |
| 5-10 | 530 |
| 5 or less | 740 |
| 2 or less | 780 |

As be definite from the results in Table 6, when the method of the present invention is employed, the smaller the grain diameter is, the higher the performance of the manufactured fuel cell is. This reason would be that the fine grains overlap each other in the state of many layers to increase a contact area between the respective grains, which fact inhibits the occurrence of pinholes, with the aid of the thin membrane being fine.

In addition, with regard to the fuel cell to be manufactured by the method of the present invention, the fuel electrode and the oxygen electrode in FIG. 19 may be replaced with each other.

According to the method of the present invention described above in detail, the high-performance solid electrolyte fuel cells can be manufactured with a high productivity but without using any large scale apparatus.

Next, the tenth aspect of the present invention will be described.

The tenth aspect thereof is directed to a solid electrolyte fuel cell which comprises many unit cells each in which a stabilized zirconia system ($ZrO_2$—CaO system, $ZrO_2$—$Y_2O_3$ system or the like) solid electrolyte or cerium oxide ($CeO_2$) system solid electrolyte which contains an additive (CaO, SrO or the like) in such an amount or more as to exhibit a maximum value of conductivity and in which a transport number of oxygen ions does not drop even under a low partial pressure of oxygen is utilized on an anode side, and a ceria system ($CeO_2$—CaO, $CeO_2$—SrO or the like) solid electrolyte having a very high conductivity is utilized on a cathode side to form the solid electrolyte having two or more layers.

According to the solid electrolyte fuel cell described above, under usual conditions of operation, the drop in the transport number of oxygen ions due to the low partial pressure of oxygen is so small as to be negligible, and the solid electrolyte on the cathode side has a high conductivity. Therefore, a performance of the cell can be improved by constituting these electrolytes in the form of a multilayer.

The multilayer solid electrolyte membrane employed in the present invention can be manufactured by the use of a usual CVD process, EVD process or flame spraying process.

Now, an embodiment of the tenth aspect of the present invention will be described. For more clarification, two terms will be first defined as follows:

Anode side electrolyte: A solid electrolyte of stabilized zirconia system or a ceria system which contains an additive in such an amount or more as to exhibit a maximum value of conductivity and in which a transport number of oxygen ions is not lowered even under a low partial pressure of oxygen.

Cathode side electrolyte: A ceria system solid electrolyte having a very high conductivity.

Figure 20:
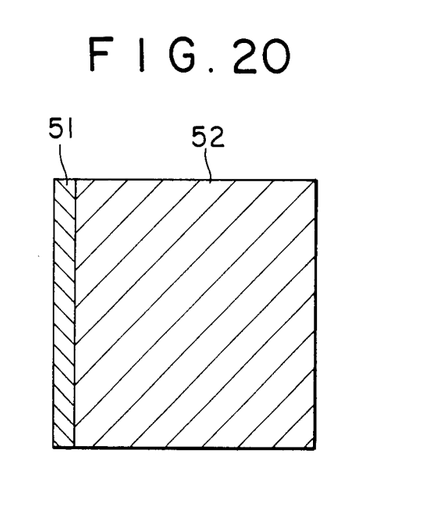
FIGS. 20 and 21 are sectional views of the solid electrolytes used in the solid electrolyte fuel cells regarding the present invention.

A solid electrolyte used in a fuel cell regarding the present invention is, for example, an electrolyte comprising an anode side electrolyte 51 and a cathode side electrolyte 52 adhering to the anode side electrolyte 51, as shown in FIG. 20.

In the fuel cell employing such a solid electrolyte, the drop in the transport number of oxygen ions due to the low partial pressure of oxygen does not occur on the anode side electrolyte 51, and since the cathode side electrolyte 52 has a high conductivity, the fuel cell employing the cathode side electrolyte 52 can maintain the high conductivity on the whole, whereby excellent cell properties can be obtained.

Figure 21:
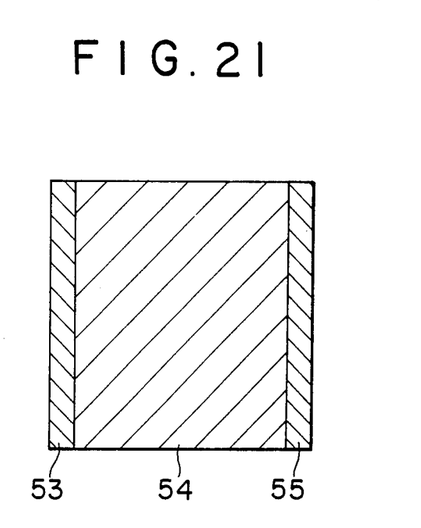

The solid electrolyte used in the fuel cell regarding the present invention is not limited to the structure shown in FIG. 20 but may take another multilayer structure comprising an anode side electrolyte 53 having a high content of CaO, a middle electrolyte 54 having an intermediate content of CaO and a cathode side electrolyte 55 having a low content of CaO. Particularly in the case the $CeO_2$—CaO system, such a multilayer type solid electrolyte as shown in FIG. 21 can be easily prepared without any seam only by controlling feed rates of $CeO_2$ and CaO. The solid electrolyte in FIG. 21 can also provide the same functional effect as in the electrolyte shown in FIG. 20.

Figure 22:
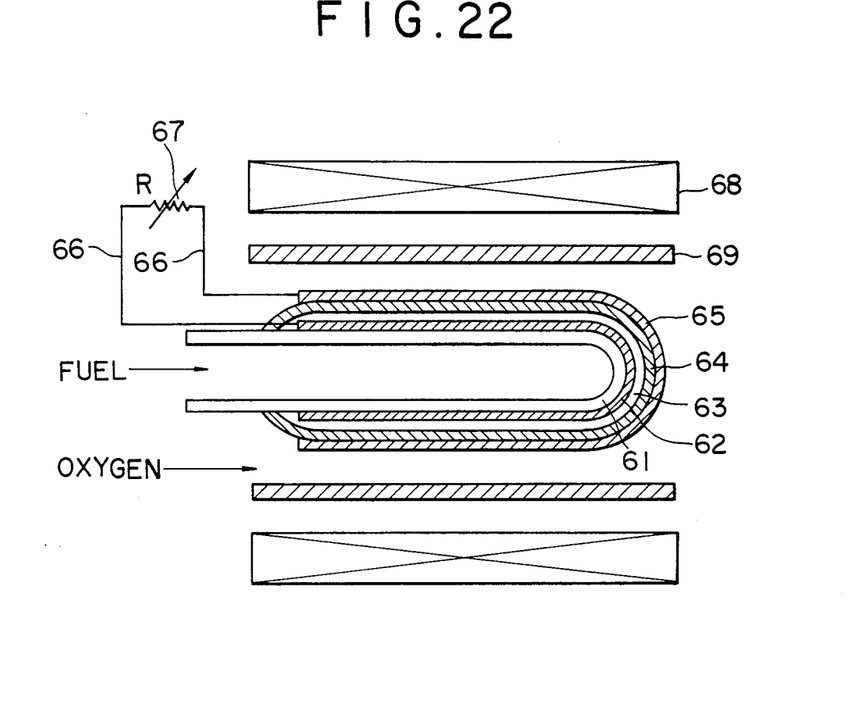
FIG. 22 is a constitutional view of a power generation test device for the solid electrolyte fuel cell of an embodiment regarding the tenth aspect of the present invention.

For the purpose of confirming the effect of the solid electrolyte fuel cell regarding the present invention, current - voltage properties are measured in accordance with such an arrangement as shown in FIG. 22.

First of all, a silver paste is applied in a thickness of about 10 μm onto a porous support 61 an end portion of which is closed, and calcination is then carried out to form a porous anode 62. Afterward, a stabilized zirconia having a composition of $(ZrO_2)_{0.9}(Y_2O_3)_{0.1}$ is applied in a thickness of 60 μm onto the anode 62 by means of a plasma flame spraying process in order to form an anode side electrolyte 63. A ceria system electrolyte having a composition of $(CeO_2)_{0.8}(CaO)_{0.2}$ is then applied in a thickness of 140 μm onto the anode side electrolyte 63 by the plasma flame spraying process, thereby forming a cathode side electrolyte 64. Further, a cathode 65 having a thickness of about 10 μm is formed on the cathode side electrolyte 64 in the same manner as in the case of the anode 62. Afterward, the anode 62 and the cathode 65 of the thus prepared solid electrolyte fuel cell are connected to a variable resistance 67 by the use of lead wires 66, 66 of a platinum net and a platinum wire, respectively.

A heat-resistant ceramic pipe 69 is then inserted into an electric furnace 68, and the solid electrolyte fuel cell is further inserted into the heat-resistant ceramic pipe 69. A test of power generation is then carried out raising a temperature in the furnace up to 900° C and employing hydrogen as a fuel and air as an oxygen source in order to investigate current - voltage properties. The results are set forth in Table 7.

In Comparative Examples 1B and 2B in Table 7, $(ZrO_2)_{0.9}(Y_2O_3)_{0.1}$ and $(CeO_2)_{0.8}(CeO)_{0.2}$ are employed alone respectively as electrolyte materials, and the solid electrolytes each having a thickness of about 200 μm are formed. For the solid electrolyte fuel cells in which the thus formed electrolytes are used, a test is carried out in the same arrangement as in FIG. 22. The results are set forth in Table 7.

TABLE 7

|  | Current Density (mA/cm$^2$) | | |
| --- | --- | --- | --- |
|  | 100 | 200 | 300 |
| Comp. Example 1B | 0.82 V | 0.70 V | 0.63 V |
| Comp. Example 2B | 0.84 V | 0.74 V | 0.66 V |
| Example B | 0.89 V | 0.79 V | 0.71 V |

The results in the aforesaid table indicate that the solid electrolyte fuel cell of the Example B can provide a higher output than the cells of Comparative Examples 1B and 2B.

According to the present invention described above in detail, a drop in an oxygen ion transport number due to a low partial pressure of oxygen does not occur on the side of the anode, and since the solid electrolyte with a high conductivity is used, the solid electrolyte fuel cell having an excellent performace can be provided.

What is claimed is:

1. A solid electrolyte fuel cell which comprises a plurality of unit cells each having a structure in which there are laminated a gas-permeable oxygen electrode made from an electron-conducting material, a solid electrolyte consisting of a $(CeO_2)_{1-x}(x=0.05$ to $0.8)$ binary system or a third component-containing $(CeO_2)_{1-x}(CaO)_x(x=0.05$ to $0.8)$ system and a gas-permeable fuel electrode made from an electron-conducting material on a gas-permeable support, said unit cells being connected to each other in series.

2. A solid electrolyte fuel cell which comprises a plurality of unit cells each having a structure in which there are laminated a gas-permeable oxygen electrode made from an electron-conducting material, a solid electrolyte consisting of a $(CeO_2)_{1-}(CaO)_x(x=0.05$ to $0.8)$ binary system or a third component-containing $(CeO_2)_{1-x}(CaO)_x(x=0.05$ to $0.8)$ system and a gas-permeable fuel electrode made from an electron-conducting material on a gas-permeable support, said unit cells being connected to each other in series the fuel cell being further provided with combustion openings for preheating oxygen or air.

3. A solid electrolyte fuel cell which comprises a plurality of unit cells each having a structure in which there are laminated a gas-permeable oxygen electrode made from an electron-conducting material, a solid electrolyte consisting of a $(CeO_2)_{1-x}(CaO)_x$ (x=0.05 to 0.8) binary system or a third component-containing $(CeO_2)_{1-x}(CaO)_x$ (x=0.05 to 0.8) system and a gas-permeable fuel electrode made from an electron-conducting material on a gas-permeable support, said unit cells being connected to each other in series the fuel cell being further provided with combustion openings for preheating oxygen or air, an oxygen or air introducing portion of the combustion opening being covered with a filler such as alumina or a filler having a catalytic action in order to prevent hot spots and facilitate preheating, starting and stopping of the fuel cell.

4. A solid electrolyte fuel cell which comprises many unit cells each in which a solid electrolyte consisting of cerium oxide or zirconium oxide dissolvingly containing a divalent oxide or a trivalent oxide of an alkaline earth metal other than calcium or a rare earth element is laminated on opposite sides or an anode side of a solid electrolyte consisting of cerium oxide or zirconium oxide dissolvingly containing calcium oxide.

5. A solid electrolyte fuel cell in which an electrolyte consisting of a solid solution of cerium oxide and a divalent or a trivalent metallic oxide of an alkaline earth metal is used and a composition of the electrolyte is varied in the direction of its membrane thickness to heighten hydration resistance.

6. A method for preparing a solid electrolyte fuel cell which comprises flame-spraying a solid solution or a ground mixture of cerium oxide and a divalent or a trivalent metallic oxide of an alkaline earth metal or the like as a material, with a feed ratio of the components adjusted to vary a composition of the electrolyte in the direction of its membrane thickness.

7. A method for preparing a solid electrolyte fuel cell which comprises subjecting cerium chloride and a divalent or a trivalent metallic chloride of an alkaline earth metal to a chemical vapor deposition treatment or an electrochemical vapor deposition treatment, with flow rates or heating temperatures of the gaseous materials adjusted to vary a composition of the electrolyte in the direction of its membrane thickness.

8. A method for preparing a solid electrolyte fuel cell which comprises mutually dissolving solid electrolyte materials of cerium oxide or zirconium oxide and a divalent or a trivalent metallic oxide of an alkaline earth metal, a rare earth element; grinding the resultant solid solution; adjusting a grain diameter of a powder obtained by the grinding; and adhesively forming, from the powder, an electrolyte thin membrane on a support of the fuel cell by means of a plasma flame spraying.

9. A method for preparing a solid electrolyte fuel cell which comprises mixing solid electrolyte materials of cerium oxide or zirconium oxide and a divalent or a trivalent metallic oxide of an alkaline earth metal, a rare earth element; grinding the resultant mixture; adjusting a grain diameter of a powder obtained by the grinding; and adhesively forming, from the powder, an electrolyte thin membrane on a support of the fuel cell by means of a flame spraying method.

10. A solid electrolyte fuel cell which comprises many unit cells each in which a stabilized zirconia system solid electrolyte or a ceria system solid electrolyte containing CaO or SrO additive in an amount to exhibit maximum conductivity is utilized on an anode side, and a ceria system solid electrolyte is utilized on a cathode side to form the solid electrolyte having two or more layers.

* * * * *